United States Patent [19]

Hunt

[11] Patent Number: 4,524,996
[45] Date of Patent: Jun. 25, 1985

[54] CORROSION-RESISTANT TUBE ASSEMBLY
[75] Inventor: Joseph M. Hunt, Natrona Heights, Pa.
[73] Assignee: Allegheny Ludlum Steel Corporation, Pittsburgh, Pa.
[21] Appl. No.: 434,652
[22] Filed: Oct. 15, 1982
[51] Int. Cl.³ .............................................. F16L 9/14
[52] U.S. Cl. ....................................... 285/55; 285/187; 285/226; 285/286; 285/369; 285/381; 285/422
[58] Field of Search ................ 285/55, 187, 226, 357, 285/286, 369, 381, 422

[56] References Cited

U.S. PATENT DOCUMENTS

| | | | |
|---|---|---|---|
| 1,306,690 | 6/1919 | Gillespie | 428/683 |
| 1,827,437 | 10/1931 | Pascoe | 228/136 |
| 1,840,305 | 1/1932 | Andrus et al. | 219/76.17 |
| 1,989,614 | 1/1935 | Halpern et al. | 137/75 |
| 2,201,862 | 5/1940 | Heisterkamp | 285/140 |
| 2,216,033 | 9/1940 | Hopkins | 29/162 |
| 2,240,021 | 4/1941 | Rutherford | 204/148 |
| 2,258,563 | 10/1941 | Armstrong et al. | 29/188 |
| 2,303,778 | 12/1942 | Wesley | 138/64 |
| 2,739,828 | 3/1956 | Schindler et al. | 285/187 X |
| 2,919,936 | 1/1960 | Hurley | 285/55 |
| 3,020,068 | 2/1962 | Costanzo | 285/55 |
| 3,077,661 | 2/1963 | Fromson | 29/470.9 |
| 3,192,612 | 7/1965 | Elliott et al. | 29/157 |
| 3,307,860 | 3/1967 | Blount et al. | 285/55 |
| 3,336,054 | 8/1967 | Blount et al. | 285/55 |
| 3,758,361 | 11/1970 | Hunter | 156/287 |
| 3,843,170 | 10/1974 | Bagnulo | 285/55 |
| 4,026,583 | 5/1977 | Gottlieb | 285/55 |
| 4,288,105 | 9/1981 | Press | 285/55 |
| 4,366,971 | 1/1983 | Lula | 285/55 |

FOREIGN PATENT DOCUMENTS

| | | | |
|---|---|---|---|
| 998495 | 1/1952 | France | 285/226 |
| 479616 | 1/1954 | Italy | 285/55 |

*Primary Examiner*—Dave W. Arola
*Attorney, Agent, or Firm*—Patrick J. Viccaro

[57] ABSTRACT

A corrosion-resistant component is provided for a corrosion-resistant tube assembly. The component includes a corrosion-susceptible metal tube and a sleeve of corrosion-resistant metal mechanically joined to the tube for protecting the end portions of the tube. The sleeve includes a first portion terminating in a ring-shaped second portion. The first portion annularly extends about a surface of a tube and is mechanically joined thereto. A second portion of the sleeve overlies the annular end surfaces of the corrosion-susceptible tube. The component includes a corrosion-resistant liner for the tube which is sealed with an inside surface of a portion of the sleeve about the circumference by an expansion joint between the liner and tube.

A corrosion-resistant tube assembly having a corrosion-resistant component is also provided such that tubes are mechanically and threadably joined by the sleeves. The assembly has all inside surfaces of the tube assembly of corrosion-resistant material. An annular notch may be provided in the sleeve or tubing or both to receive the sealing and expansion ring.

13 Claims, 5 Drawing Figures

U.S. Patent  Jun. 25, 1985  4,524,996
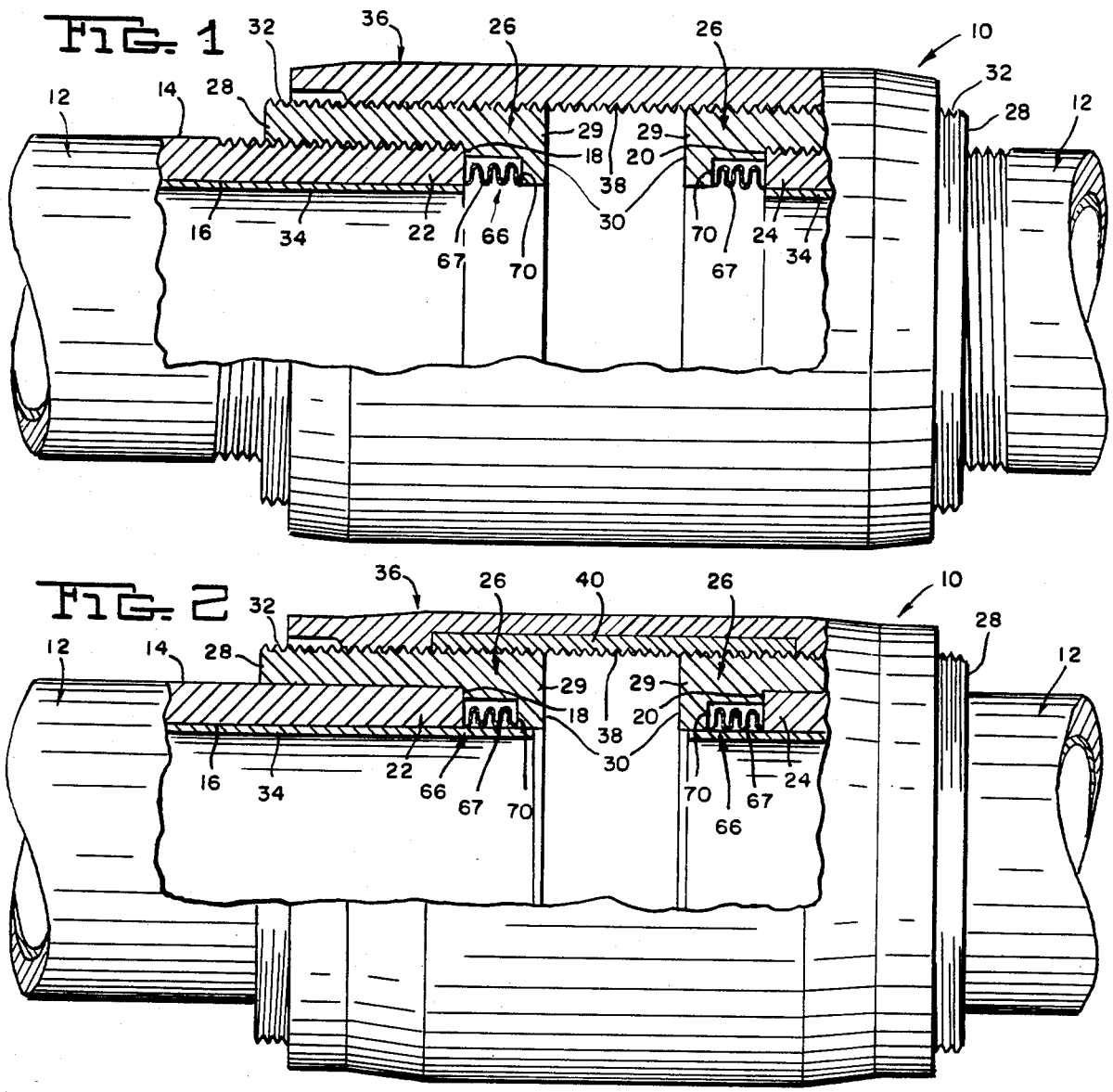
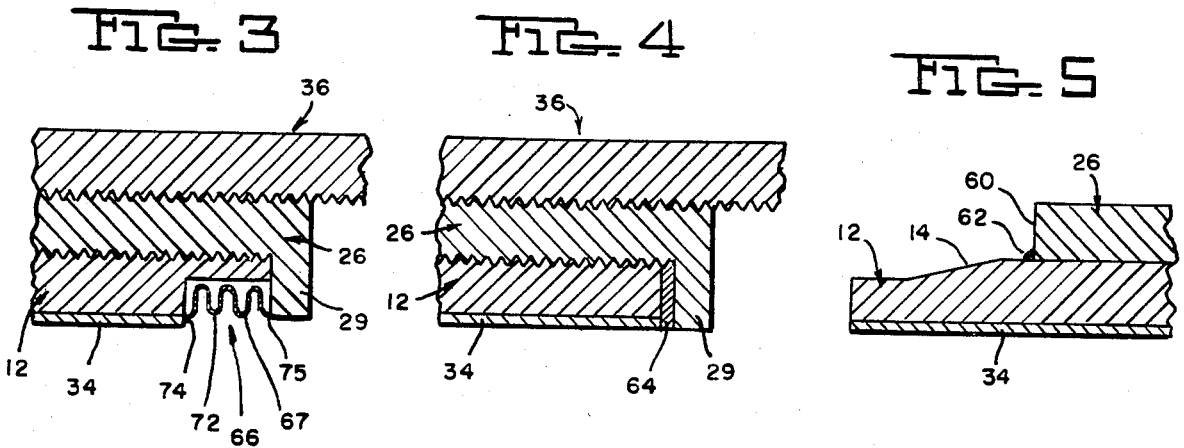

CORROSION-RESISTANT TUBE ASSEMBLY

BACKGROUND OF THE INVENTION

The present invention relates to a metallic tube assembly having corrosion-resistant joints. Particularly, this invention relates to metallic tube assemblies having all inside surfaces and joints comprising corrosion-resistant material. More particularly, the present invention relates to carbon or low-alloy steel oil well tubing having a corrosion-resistant liner and corrosion-resistant coupling device to provide a tube assembly wherein all inside surfaces are of corrosion-resistant material.

The perception that oil and gas reserves are dwindling has stimulated oil and gas well drillers to drill wells of greater depths, often in excess of 20,000 feet. Many of such deeper wells may contain from moderate to very high amounts of corrosives including hydrogen sulfide, carbon dioxide, fluorides, chlorides and mixtures thereof. Such wells containing corrosives, and commonly called sour wells, present severe and aggressive conditions for conventional gas and oil well tubing. Typically, such tubing is exposed to such corrosives at temperatures as high as about 300° F. to 500° F. or higher, which substantially increases the metals' susceptibility to corrosion. Another adverse condition to which such metallic tubing is exposed is hydrogen-induced embrittlement of the metal. Generally, such metallic tubing is made of higher strength materials which are more susceptible to hydrogen embrittlement than the lower strength metals.

Generally, carbon steel tubing is used in drilling oil and gas wells. With the requirements for deeper wells, alternative materials have been proposed in order to withstand the severe corrosive environments and conditions. A prior approach of providing inhibitors in carbon steel poses logistic problems, requires auxiliary handling and treatment facilities, is expensive and may not be economical for certain severe corrosive conditions experienced in many sour wells. Another alternative would be to completely convert from carbon steel tubing to various types of stainless steel tubing depending upon the severity of the conditions. Such an approach would be expensive because of the tonnage of stainless steel tubing required for deep wells.

Another approach would be to line the conventional metal tubing with corrosion-resistant materials. Various types of liners for tubing are known in the prior art as disclosed in U.S. Pat. Nos. 1,306,690; 1,827,437; 1,840,305; 2,258,563; 2,303,778; 3,077,661; 3,192,612; and 3,758,361. Also, the use of gaskets at pipe joints to inhibit corrosion is shown in U.S. Pat. Nos. 1,989,614; 2,201,862; 2,919,936; and 3,020,068. The practice of plating selective areas of parts to be connected is disclosed in U.S. Pat. No. 2,240,021. Additionally, various arrangements to inhibit corrosion in connected pipes are shown in U.S. Pat. Nos. 2,216,033; 3,843,170; and 4,026,583.

U.S. Pat. No. 4,366,971, issued Jan. 4, 1983, by the common Assignee of the present invention, discloses a novel tube assembly which provides that all of the inside surfaces of the assembly are resistant to corrosive attack and minimizes the cost of providing an acceptable corrosion-resistant tubing assembly. The patent disclosure pertains to providing a weld overlay or metallurgically-bonded portion of corrosion-resistant material on the ends of the tubes at the joints.

U.S. Pat. No. 3,336,054 discloses a well pipe carrying a corrosion-resistant metal liner and threaded joints for interconnecting well pipe by threaded pin and box members. The tubing may include a groove for receiving a seal member between a sleeve and an adjacent tube. U.S. Pat. No. 3,307,860 relates to a joint for well pipe having a tubular coupling and a pressure actuated seal of a deformable ring between the coupling and tubing.

There is a potential for a differential longitudinal expansion between the tube liner and the corrosion-susceptible tube of prior tube assemblies. Such expansion may be the result of a different coefficient of expansion for liner and the tube. It is most likely that the liner, made of an austenitic stainless steel, for example, would have a higher coefficient of expansion than a corrosion-susceptible tube made of carbon steel for example. A differential in longitudinal expansion may also result from exposing the liner to higher average temperatures than tube. Differential longitudinal expansion may also result from a combination of these effects and may be pronounced in deep hole wells where bottom hole temperatures may reach 400° F. (204° C.) or more.

There is still a need for a relatively low-cost corrosion-resistant tube assembly which facilitates easier field use and assembly by avoiding metallurgical or adhesive bonding of tubing joints and yet permits relative movement due to expansion between the liner and tubing. The assembly should include typical carbon steel or low-alloy steel tubes having a corrosion-resistant lining, yet provide expansible joint assemblies with all inside surfaces being of corrosion-resistant materials. Such tubing should also be compatible with carbon steel casing into which the tubes are inserted during service to avoid galvanic corrosion problems.

SUMMARY OF THE INVENTION

In accordance with the present invention, a corrosion-resistant tube assembly is provided having mechanically-joined tubes which provide an assembly having all corrosion-resistant inside surfaces.

A corrosion-resistant component is provided for a corrosion-resistant tube assembly. The component includes a corrosion-susceptible metal tube and a sleeve of corrosion-resistant metal mechanically joined to the tube for protecting the end portions of the tube. The sleeve includes a first portion terminating in a ring-shaped second portion. The first portion annularly extends about a surface of a tube and is mechanically joined thereto. A second portion of the sleeve overlies the annular end surfaces of the corrosion-susceptible tube. The component includes a corrosion-resistant liner for the tube which is sealed with an inside surface of a portion of the sleeve about the circumference. A corrosion-resistant annular expansion-sealing ring is fixed to the end surface of the liner and is positioned at a location near the end surface of the tube and inside surface of the second portion of the sleeve to provide an expansion joint between the liner and tubing.

A corrosion-resistant tube assembly having a corrosion-resistant component is also provided such that tubes are mechanically and threadably joined by the sleeves. The assembly has all inside surfaces of the tube assembly of corrosion-resistant material.

BRIEF DESCRIPTION OF THE DRAWINGS

FIG. 1 is a partial cross-sectional view of a tube assembly of the present invention;

FIG. 2 is a partially cross-sectional view of an alternative tube assembly of the present invention;

FIGS. 3 and 4 are cross-sectional views of alternative joints of the tube assembly of the present invention; and FIG. 5 is a cross-sectional view of an alternative embodiment of the present invention.

DETAILED DESCRIPTION OF THE PREFERRED EMBODIMENTS

As illustrated in the drawings, the tube assembly 10 of the present invention is provided with corrosion-resistant surfaces in the interior thereof. As shown in FIGS. 1 and 2, a significant portion of the tube assembly is comprised of corrosion-susceptible metal tubing 12 which is not exposed to corrosives in the joint assembly 10. Therefore, conventional and various grades of low-cost carbon steels, such as C75 or C80, or other low-alloy steels which are corrosive-susceptible materials, can be used as tubing 12 in the assembly 10.

The corrosion-susceptible metal tubing 12 has an outside surface 14, an inside surface 16 and end surfaces 18 and 20. Tubes 12 of various lengths, diameters, gage and shapes, including curved tubes, tubes having T-shapes, Y-shapes and other junctions, as well as tubes having reducing diameters along the length thereof, are contemplated by the assembly of the present invention. Regardless of the type or shape of corrosion-susceptible tubing employed, the end portions 22 and 24 must be isolated or covered with a corrosion-resistant metal, such as stainless steel, at least along a portion of the outside surface 14, along inside surface 16, and across the annular end surfaces 18 and 20 of the corrosion-susceptible tube 12. In U.S. Pat. No. 4,366,971 mentioned above, such isolation is provided by a metallurgically-bonded weld overlay of corrosion-resistant metal. In the present invention, such isolation is provided by metallurgically bonding or mechanically connecting a sleeve of corrosion-resistant material to the end portions of the corrosion-susceptible tubing while permitting joint expansion between the liner and tube as explained in detail below. The present invention is applicable to pin and box arrangements and coupler joint assemblies.

FIG. 1 illustrates a partial cross-sectional view of a tube assembly of the present invention. Two tubes 12 are each provided with substantially identical sleeves 26 on the end thereof to facilitate mechanically joining the two tubes. Generally, overlay sleeve 26 has a first and second portion. The first portion 28 may be an annular or ring-shaped portion having an inside and outside surface for contacting and engaging tubing 12 and metal connector or coupler 36, respectively. First portion 28 terminates at one end in a second portion 29, which is an annular or ring-shaped portion having a diameter smaller than the inside diameter of the first portion 28. In FIG. 1, for the left-side tube 12, the inside diameter of second portion 29 of sleeve 26 is smaller than the inside diameter of first portion 28.

The sleeve 26 is comprised of any corrosion-resistant alloy, preferably stainless steel, or other material such as nickel base, cobalt base alloys, chromium-nickel-cobalt-molybdenum alloys, titanium or titanium alloys. However, a variety of corrosion-resistant materials may be selected for the sleeve, depending upon the particular corrosion environment and the required strength of the sleeve.

The sleeve 26 typically fits over the end portion of the tubing with close tolerance. In the embodiment in FIG. 1, the sleeve 26 is threaded onto the end portion of the tubing. First portion 28 of sleeve 26 has threads on the inside surface to be threadably engaged with the outer surface of tube 12. First portion 28 of second sleeve 26 has threads 32 on the outside surface to be threadably engaged with the inside surface of the metal connector 36.

The thread parameters, including size, space and pitch, should be chosen with respect to the service conditions, sealing requirements and strength requirements for the tube assembly of the present invention. The depth of such threads 32 must not penetrate the sleeve 26 to expose any of the outside surface 14 of the corrosion-susceptible pipe 12, or adversely impact on the integrity and strength of the sleeve 26.

Alternatively, as shown in FIG. 2, sleeve 26 may be slip fit or shrink fit by known techniques over the end portions of the tubing and only have threads 32 on the outside surface.

In FIGS. 1 and 2, overlay sleeve 26 includes an annular notch or groove 70 on an inside surface adjacent the peripheral end surface or tube 12 for receiving an annular expansion ring 67 to provide an expansion joint 66. Ring 67 is located between the end of liner 34 and overlay sleeve 26 on the inside surface of sleeve 26 to isolate tube 12 from the corrosive environment of the tube assembly.

A corrosion-resistant metallic liner 34 having inside, outside and end surfaces is provided within the corrosive-susceptible tube 12. Liner 34 may be a separate element which is disposed in and along the entire length of the tube 12. Typically, such liner 34 has a gage of about 0.005 to 0.100 inch, or more preferably within the range of from 0.010 to 0.040 inch. Most preferred liners for oil well applications have a gage of about 0.015 to 0.030 inch. In another embodiment, the liner 34 may be coextruded, explosively bonded or otherwise metallurgically bonded to the inside surface of the tube. In embodiments where the liner 34 is coextruded or bonded to the tube 12, the need of an expansion joint between the liner and tube is minimal for the differential expansion is nil.

The liner 34 preferably extends near the end surfaces 18 and 20 of the tube 12. In FIGS. 1 and 2, liner 34 is shown to extend about to the end surface 18 of one tube 12 or beyond end surfaces 18 and 20 of tubes 12, respectively. In both embodiments, liner 34 extends to a position adjacent to an inside surface of sleeve 26. Liner 34 may extend to a position adjacent annular groove 70 on an inside surface of second portion 29 of sleeve 26 or, alternatively, to a position adjacent an inside surface of second portion 29 of sleeve 26 as shown in FIG. 2. Preferably, the embodiment of FIG. 2 may be used to facilitate flow of fluids through joint assembly 10 by avoiding direct flow contact with annular ring 67.

In another embodiment, as illustrated in FIG. 3, the end portion of the liner 34 may comprise a corrosion-resistant expansion joint 66 in groove 72 of tube 12 to protect the assembly from the corrosive environment yet permit slight expansion and contraction of the assembly without adversely affecting such corrosion resistance. Annular notch or groove 72 is located on the inside surface of tube 12 at the end portion for receiving an annular expansion-sealing ring 67 to provide an expansion joint 66. Joint 66 may include a resilient and corrosive-resistant material, such as rubbers, elastomers, metal, plastics or other suitable material, interposed between liner 34 and second portion 29 of sleeve 26 to isolate tube 12. Any differential expansion between liner 34 and tube 12 permits relative movement therebetween and avoids any possibility of buckling of the liner as could occur if it was rigidly fixed to overlay sleeve 26 and tube 12. Ring 67 is located between the end of liner 34 and overlay sleeve 26 on the inside surface of tube 12 to isolate tube 12 from the corrosive environment of the interior of the tube assembly. Preferably, ring 67 is secured or fixed to the end of liner 34 and contacts overlay sleeve 26. More preferably, ring 67 is fixed to liner 34 and overlay sleeve 26 as shown in FIG. 3 at locations 74 and 75.

In an alternative embodiment, a notch 70 or 72 may be provided on both the inside surface of overlay sleeve 26, as shown in FIG. 1, and on the end portion of tube 12, as shown in FIG. 2.

In certain service environments and conditions, the second portion 29 of sleeve 26, which is adjacent the annular end surface 18 or 20 of the corrosion-susceptible tube 12, may include a sealing gasket 64 which does not form an expansion joint. Without the need for welding, the embodiment assures that all inside surfaces of the tube assembly comprise corrosion-resistant material. A corrosion-resistant annular gasket 64, such as a stainless steel metal gasket, may be used at the junction of the second portion 29 of sleeve 26 and the liner 34 to provide such seal, as shown in FIG. 4. Gasket 64 may completely overlie end portions of tube 12 and liner 34 and be held in place by overlaying second portion of sleeve 26.

FIG. 5 illustrates another embodiment wherein it may be desired to weld an end portion 60 of the first portion 28 of sleeve 26 to the outside surface 14 of the corrosion-susceptible tube 12. Such weld 62, which may be continuous or spot welded around the circumference of the tube, may assist in maintaining the sleeve 26 in place. Such weld 62 may be preferred in cases where the sleeve is force fit, rather than threaded, onto the tube 12.

The end portions of the lined tubes 12 may be made corrosion resistant as described above, so that two or more longitudinally-aligned end portions of such tube 12 may be connected, as shown in FIGS. 2 and 3, such tubes may be attached by threading an appropriate connector 36 onto the threads 32 provided along the outside surface of the sleeve 26 on the aligned tubes. In such embodiment, the inside surface 38 of the connector 36 must be comprised of a corrosion-resistant material at least at the junction of the two longitudinally-aligned end portions of the tubes 12. In one embodiment, as shown in FIG. 1, the connector may be comprised totally of a corrosion-resistant material, such as stainless steel. In another embodiment, as shown in FIG. 2, the inside surface 38 may be comprised of a bonded coating or overlay 40 of corrosion-resistant material, such as stainless steel. When the bonded coating 40 is used on the inside surface 38, the coating or overlay 40 should extend at least ¼ inch, and preferably at least ½ inch, into the threaded area of the sleeve 26.

It should also be appreciated that various additional considerations may have to be taken into account in contructing tube assemblies of the present invention. For example, the expansion characteristics and differentials between the tube, the liner and the overlay material must not adversely affect the performance and integrity of the tube assembly.

Although several embodiments of this invention have been shown and described, it will be apparent to those skilled in the art that modifications may be made therein without departing from the scope of this invention.

What is claimed is:

1. In a corrosion-resistant tube assembly, a corrosion-resistant component comprising:
    a corrosion-susceptible metal tube having an outside surface, an inside surface and end surfaces, and to be located adjacent another of said tube near their end surfaces;
    an overlay sleeve of corrosion-resistant metal having a first and second portion, said first portion annularly extending about a surface of said tube and one surface of said sleeve adjacent the tube being mechanically joined to at least a portion of the tube surface, said first portion terminating in a second portion of the sleeve overlying the annular end surface of said tube, said sleeve other surface of said first portion disposed away from the surface of said tube and being threaded; and
    a corrosion-resistant, tubular metallic liner having an outside surface, an inside surface and end surfaces, the outside surface of the liner being adjacent the entire circumference of the inside surface of the corrosion-susceptible metal tube along its longitudinal extent;
    the improvement comprising:
    a corrosion-resistant annular expansion-sealing ring annularly fixed to the end surface of the liner and positioned at a location at the end surface of the corrosion-susceptible tube and between the liner and inside surface of the second portion of the sleeve and bearing thereagainst to seal the corrosion-susceptible metal tube about the circumference thereof from any corrosives in the tube assembly and to provide an expansion joint between the liner and tube.

2. In a corrosion-resistant tube assembly comprising:
    a plurality of corrosion-susceptible metal tubes each having an outside surface, an inside surface and end surfaces, and each aligned with another of said tubes near their end surfaces;
    an overlay sleeve of corrosion-resistant metal having a first and second portion, said first portion annularly extending about the surface of said tubes and one surface of the sleeve adjacent the tube being mechanically joined to at least a portion of the surface of said tube, said first portion terminating in a second portion overlying the annular end surfaces of said one tube, the sleeve other surface of the first portion disposed away from the surface of said tube and being threaded;
    a corrosion-resistant, tubular metallic liner having an outside surface, an inside surface and end surfaces, the outside surface of said liner being adjacent the entire circumference of the inside surface of each corrosion-susceptible metal tube along its longitudinal extent thereof; and
    a metallic connector having a corrosion-resistant inside surface and threadably engaged with the threaded outer surface of the first portion of each sleeve on adjacent tubes;
    the improvement comprising:
    a corrosion-resistant annular expansion-sealing ring annularly fixed to the end surface of the liner and positioned at a location at the end surface of the corrosion-susceptible tube and annularly fixed to the inside surface of the second portion of the sleeve to seal the corrosion-susceptible metal tube about the circumference thereof from any corrosives in the tube assembly and to provide an expansion joint between the liner and the tube.

3. An assembly as set forth in claims 1 or 2 wherein an annular groove is provided in the inside surface of the second portion of the sleeve adjacent the end surfaces of the tubing and metallic liner.

4. An assembly as set forth in claims 1 or 2 wherein an annular groove is provided in the inside surface of the tubing at the end surface adjacent the end surface of the liner and the inside surface of the second portion of the sleeve.

5. An assembly as set forth in claims 1 or 2 wherein said assembly is corrosion resistant to corrosives selected from the group consisting of hydrogen sulfide, carbon dioxide, fluorides, chlorides and mixtures thereof.

6. An assembly as set forth in claims 1 or 2 wherein the corrosion-susceptible tubing is selected from the group consisting of carbon steel and low-alloy steel.

7. An assembly as set forth in claims 1 or 2 wherein the end surfaces of the liner extend approximately to the end of the overlay sleeve on the peripheral end portions of the tubing.

8. An assembly as set forth in claim 2 wherein the inside surface of the metallic connector near the end portions of the adjacent tubes comprises an overlay of corrosion-resistant metal.

9. An assembly as set forth in claims 1 or 2 wherein said sleeve is threaded onto the end portion of the corrosion-susceptible tubing to provide said mechanical bond.

10. An assembly as set forth in claims 1 or 2 wherein said sleeve is shrink fit onto the end portion of the corrosion-susceptible tubing to provide said mechanical bond.

11. An assembly as set forth in claims 1 or 2 wherein the corrosion-resistant expansion-sealing ring is a material selected from the group consisting of rubber, elastomers and metal.

12. In a corrosion-resistant tube assembly, a corrosion-resistant component comprising:
   a corrosion-susceptible metal tube having an outside surface, an inside surface and end surfaces, and to be located adjacent another of said tube near their end surfaces;
   an overlay sleeve of corrosion-resistant metal having a first and second portion, said first portion annularly extending about a surface of said tube and one surface of said sleeve adjacent the tube being mechanically joined to at least a portion of the tube surface, said first portion terminating in a second portion of the sleeve overlying the annular end surface of said tube, said sleeve other surface of said first portion disposed away from the surface of said tube and being threaded; and
   a corrosion-resistant, tubular metallic liner having an outside surface, an inside surface and end surfaces, the outside surface of the liner being adjacent the entire circumference of the inside surface of the corrosion-susceptible metal tube along its longitudinal extent;
   the improvement comprising:
   a corrosion-resistant annular gasket ring positioned at a location between and in contact with the end surface of the liner and the inside surface of the second portion of the sleeve to seal the corrosion-susceptible metal tube about the circumference thereof from any corrosives in the tube assembly.

13. An assembly as set forth in claim 12 wherein said gasket is stainless steel.

* * * * *